(12) United States Patent
Jansson

(10) Patent No.: US 6,942,421 B2
(45) Date of Patent: *Sep. 13, 2005

(54) MANUFACTURE OF ARTICULATED, PREDOMINANTLY CONCRETE MAT

(76) Inventor: Jan Erik Jansson, 814 S. Sierra Ave., Solana Beach, CA (US) 92075-2616

( * ) Notice: Subject to any disclaimer, the term of this patent is extended or adjusted under 35 U.S.C. 154(b) by 0 days.

This patent is subject to a terminal disclaimer.

(21) Appl. No.: 10/619,274

(22) Filed: Jul. 14, 2003

(65) Prior Publication Data

US 2004/0086344 A1 May 6, 2004

Related U.S. Application Data

(63) Continuation-in-part of application No. 10/286,677, filed on Nov. 1, 2002, now Pat. No. 6,612,776.

(51) Int. Cl.⁷ .............................. E02B 3/14; E01C 5/00
(52) U.S. Cl. ............................ 405/20; 404/35; 404/42; 404/45; 52/98
(58) Field of Search .................... 405/15–20, 302.6, 405/302.7; 404/34, 35, 37, 38, 42, 45; 52/98

(56) References Cited

U.S. PATENT DOCUMENTS

| 1,947,371 | A | | 2/1934 | Mattison |
| 3,008,256 | A | | 11/1961 | Rice |
| 3,557,669 | A | * | 1/1971 | Fenton ........................ 404/42 |
| 3,891,340 | A | | 6/1975 | Bolli |
| 4,185,939 | A | * | 1/1980 | Barth et al. ................... 404/38 |
| 4,375,928 | A | | 3/1983 | Crow et al. |
| 5,108,222 | A | | 4/1992 | Jansson et al. |
| 6,585,449 | B2 | * | 7/2003 | Chen ............................. 404/2 |
| 2003/0072611 | A1 | | 4/2003 | Chen |

FOREIGN PATENT DOCUMENTS

| DE | 4020650 | * | 8/1991 |
| WO | WO 93/07339 | * | 4/1993 |

* cited by examiner

*Primary Examiner*—Sunil Singh
(74) *Attorney, Agent, or Firm*—Wood, Philips, Katz, Clark & Mortimer

(57) ABSTRACT

In the manufacture of an articulated, predominantly concrete mat, which comprises concrete blocks and a flexible geogrid embedded in such blocks and in which the flexible geogrid defines flexible members connecting such blocks to one another, an intermediate article being a concrete slab is cast, in which a flexible geogrid is embedded. The slab has relatively thinner portions, along which the slab is breakable to form such blocks, and relatively thicker portions, which become such blocks when the slab is broken along the relatively thinner portions. The relatively thicker portions are arranged in parallel rows and are staggered in adjacent rows, before the slab is broken therealong, and the relatively thicker portions in alternate rows are aligned in parallel columns, before the slab is broken therealong.

5 Claims, 2 Drawing Sheets

MANUFACTURE OF ARTICULATED, PREDOMINANTLY CONCRETE MAT

CROSS-REFERENCE TO RELATED APPLICATION

This application is a continuation-in-part of Ser. No. 10/286,677 (now U.S. Pat. No. 6,612,776 B1), which was filed on Nov. 1, 2002, and the disclosure of which is incorporated herein by reference.

TECHNICAL FIELD OF THE INVENTION

This invention pertains to the manufacture of an articulated, predominantly concrete mat, which comprises concrete blocks and a flexible geogrid embedded in said blocks and in which the flexible geogrid defines flexible members connecting said blocks to one another.

BACKGROUND OF THE INVENTION

An articulated, predominantly concrete mat is disclosed in U.S. Pat. No. 5,108,222, the disclosure of which is incorporated herein by reference. As disclosed therein, such a mat has numerous uses in retarding earth erosion due to wind, water, or both. Such a mat may be also used to line a driveway, a parking area, or an emergency roadway.

As disclosed in U.S. Pat. No. 5,108,222, supra, the articulated, predominantly concrete mat comprises concrete and a flexible geogrid, which is embedded in said blocks, and the flexible geogrid defines flexible members connecting said blocks to one another.

SUMMARY OF THE INVENTION

This invention facilitates the manufacture of an articulated, predominantly concrete mat, which comprises concrete blocks and a flexible geogrid embedded in said blocks and in which the flexible geogrid defines flexible members connecting said blocks to one another, by providing an intermediate article being a concrete slab, in which a flexible geogrid is embedded. When this invention is considered in terms of a process, the concrete slab is cast and the flexible geogrid is embedded when the concrete slab is cast.

The slab has relatively thinner portions, along which the slab is breakable to form said blocks. The slab has relatively thicker portions, which become said blocks when the slab is broken along the relatively thinner portions. U.S. Pat. No. 6,612,776 B1, supra, illustrates and describes an embodiment wherein the relatively thicker portions are arranged in parallel rows and parallel columns, before the slab is broken along the relatively thinner portions.

In an alternative embodiment illustrated and described herein, the relatively thicker portions are arranged in parallel rows, in which the relatively thicker portions in adjacent rows are staggered, before the slab is broken along the relatively thinner portions. Preferably, in the alternative embodiment illustrated and described herein, the relatively thicker portions in alternate rows are aligned in parallel columns, before the slab is broken along the relatively thinner portions.

Depending upon the flexible geogrid that is used, the flexible members may be flexible straps, as disclosed in U.S. Pat. No. 5,108,222, supra, or flexible strands or strand bundles.

DETAILED DESCRIPTION OF THE ILLUSTRATED EMBODIMENT

Figure 1:
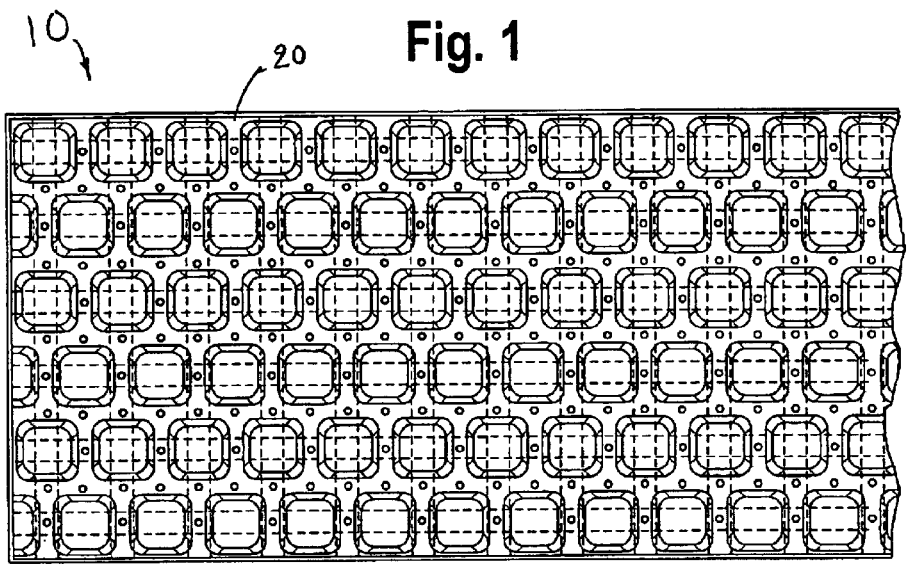
FIG. 1 is a plan view of a concrete slab, in which a flexible geogrid is embedded, whereby to provide an intermediate article embodying this invention.
Figure 2:
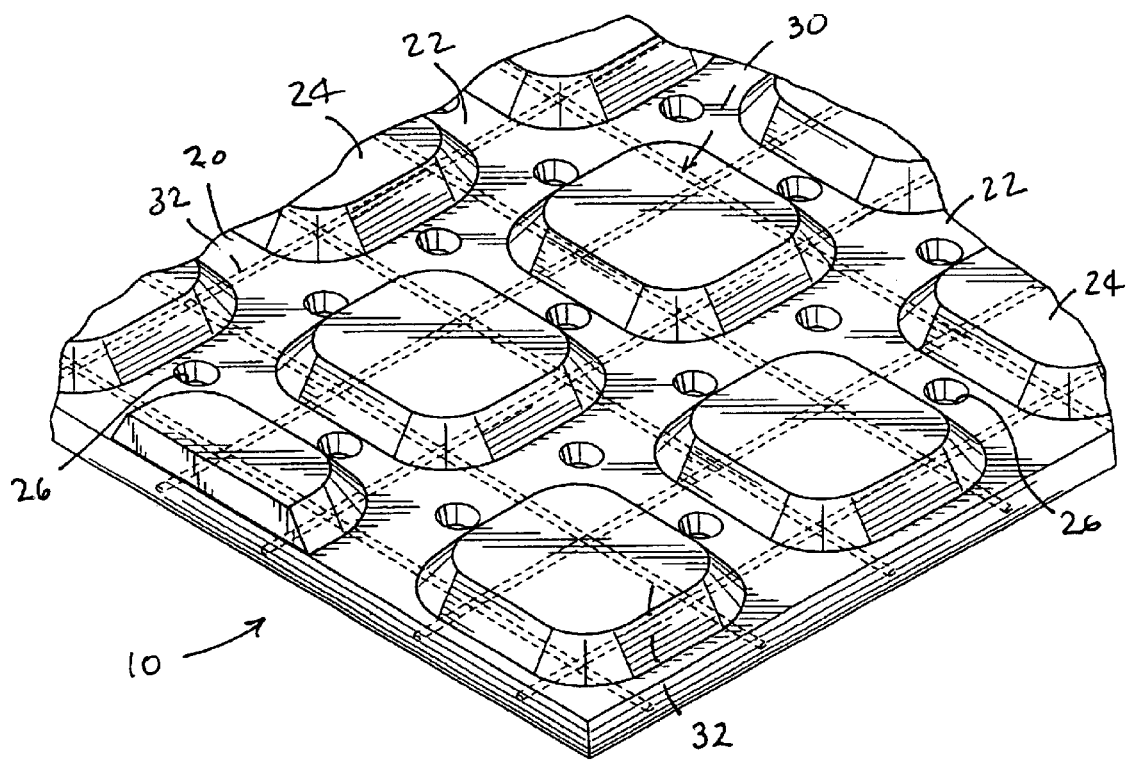
FIG. 2, on a larger scale, is a fragmentary, isometric view of an exemplary corner of the concrete slab, in which the flexible geogrid is embedded.

In an alternative embodiment, which is illustrated in FIGS. 1 through 4, an intermediate article 10 in the manufacture of an articulated, predominantly concrete mat, which is similar to the articulated, predominantly concrete mat disclosed in U.S. Pat. No. 5,108,222, supra, comprises a rectangular, concrete slab 20 and a flexible geogrid 30, which is embedded in the concrete slab 20, so that flexible members 32 of the flexible geogrid 30 extend longitudinally and transversely, when the concrete slab 20 is cast.

The concrete slab 20 is cast, in an inverted orientation relative to its illustrated orientation, so as to have relatively thinner portions 22 extending longitudinally and transversely and so as to have relatively thicker portions 24, which are separated from one another by the relatively thinner portions 22. As illustrated and described herein, the relatively thicker portions 24 are arranged in parallel rows, which extend from left to right in FIG. 1 and in which the relatively thicker portions 24 in adjacent rows are staggered, before the slab 20 is broken along the relatively thinner portions 22. Moreover, the relatively thicker portions 24 in alternate rows are aligned in parallel columns, which extend from top to bottom in FIG. 1, before the slab 20 is broken along the relatively thinner portions.

Many flexible geogrids available commercially are suitable for the flexible geogrid 30. Depending upon the flexible geogrid 30 that is used, the flexible members 32 may be flexible straps, as disclosed in U.S. Pat. No. 5,108,222, supra, or flexible strands or strand bundles, as illustrated schematically herein.

Figure 3:
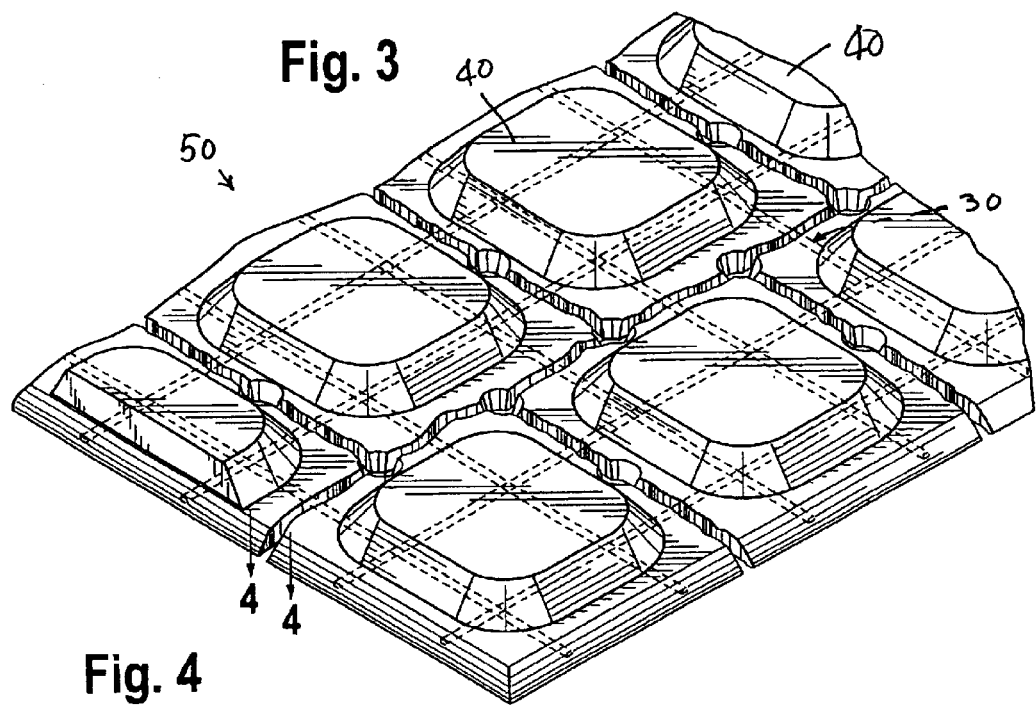
FIG. 3, on a similar scale, is a fragmentary, isometric view, which is similar to a portion of FIG. 2 but which is taken after the concrete slab has been broken along relatively thinner portions, whereby relatively thicker portions have become discrete, concrete blocks, which are connected to one another by flexible elements of the flexible geogrid, so as to provide an articulated, predominantly concrete mat.
Figure 4:
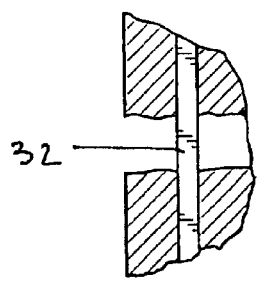
FIG. 4 is an enlarged, fragmentary, cross-sectional detail, as taken along line 4—4 of FIG. 3, in a direction indicated by arrows.
Figure 5:
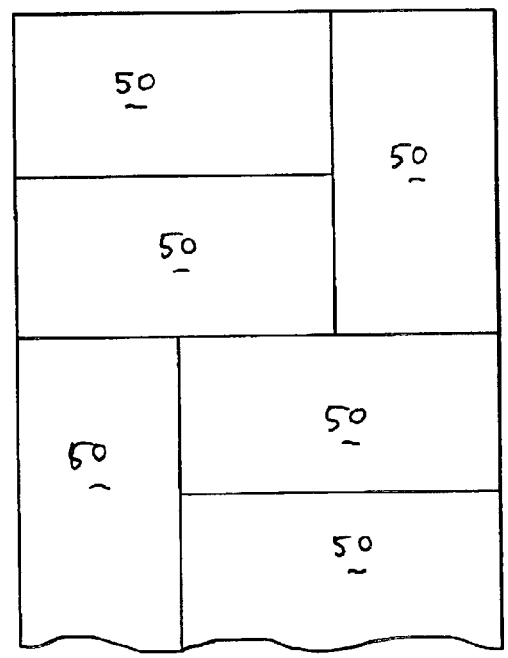
FIG. 5 is a simplified, schematic layout of plural mats, each of which may embody this invention.

As illustrated in FIGS. 3 and 4, the concrete slab 20 is breakable along the relatively thinner portions 22, so that the relatively thicker portions 24 become discrete, concrete blocks 40 connected to one another by flexible members 32 of the flexible geogrid 30, which remains embedded in the respective blocks 40, whereby an articulated, predominantly concrete mat 50 is provided.

So as to facilitate breaking of the concrete slab 20 along the relatively thinner portions 22, the concrete slab 20 has spaced holes 26 having circular mouths, along the relatively thinner portions 22. The relatively thinner portions 22 may be sufficiently thin to enable the concrete slab 20 to be thus broken by its own weight if and when the concrete slab 20 is lifted from its edges. Alternatively, the concrete slab 20 may be thus broken by a person wielding a suitable tool, such as an adze.

As exemplary dimensions, all of which are approximate, the concrete slab 20 may have a width of twenty-four inches and a length of forty-eight inches, the relatively thinner portions 22 may have a thickness of three-eights inch, the relatively thicker portions 24 may have a thickness of one inch, the flexible geogrid 30 may have two inch square openings, which are defined by the flexible members 32, and the respective blocks 40 may be four inches square.

What is claimed is:

1. A concrete mat for an uneven ground surface, comprising:

a concrete slab having relatively thick portions defining blocks connected by relatively thinner portions, said relatively thinner portions including holes therein spaced from said relatively thick portions and defining weakened areas whereby said slab is broken along portions of the relatively thinner portions which are spaced from said relatively thick portions defining blocks to follow the uneven ground surface, the defines block being arranged in parallel rows and being staggered in adjacent rows; and a flexible geogrid embedded in said slab, said geogrid defining flexible members connecting said blocks to one another when the slab is broken along the relatively thinner portions;

wherein grass can grow through said broken weakened areas.

2. The concrete mat of claim 1, wherein said defined blocks have sides adjacent one another in said mat, and wherein said relatively thinner portions extend between and across substantially the entirety of said adjacent sides.

3. The concrete mat of claim 1, wherein said holes in said thinner portions define weakened areas generally centrally located between adjacent blocks.

4. The concrete mat of claim 1, wherein said holes are generally vertically oriented to define said weakened areas in a generally vertical orientation.

5. The concrete mat of claim 1, wherein at least some of said holes extend vertically through said relatively thinner portions and have square mouths.

* * * * *